United States Patent
Wang et al.

(10) Patent No.: US 7,929,563 B2
(45) Date of Patent: Apr. 19, 2011

(54) SYSTEM AND/OR METHOD FOR CHANNEL ESTIMATION IN COMMUNICATION SYSTEMS

(75) Inventors: Shuangquan Wang, Kearny, NJ (US); Ali Abdi, New Milford, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1064 days.

(21) Appl. No.: 11/336,018

(22) Filed: Jan. 20, 2006

(65) Prior Publication Data

US 2006/0274841 A1 Dec. 7, 2006

Related U.S. Application Data

(60) Provisional application No. 60/645,526, filed on Jan. 20, 2005.

(51) Int. Cl.
*H04L 12/56* (2006.01)
*H04J 1/16* (2006.01)

(52) U.S. Cl. .................. 370/430; 370/252; 370/419

(58) Field of Classification Search .............. 370/252, 370/208, 430, 328, 329, 419
See application file for complete search history.

(56) References Cited

U.S. PATENT DOCUMENTS

| | | | |
|---|---|---|---|
| 2004/0192218 A1* | 9/2004 | Oprea | 455/73 |
| 2005/0135291 A1 | 6/2005 | Ketchum et al. | |
| 2005/0141624 A1 | 6/2005 | Lakshmipathi et al. | |
| 2005/0195734 A1 | 9/2005 | Sandell et al. | |
| 2007/0217546 A1* | 9/2007 | Sandell et al. | 375/299 |

OTHER PUBLICATIONS

Foschini et al., "On Limits of Wireless Communications in a Fading Environment," *Wireless Personal Commun.*, vol. 6, pp. 311-335 (1998).
Alamouti, "A Simple Transmit Diversity Technique for Wireless Communications," *IEEE J. Select. Areas Commun.*, vol. 16, pp. 1451-1458 (1998).
Hassibi et at, "How Much Training is Needed in Multiple-Antenna Wireless Links?" *IEEE Trans. Inform. Theory*, vol. 49, pp. 951-963 (2003).
Simeone, "Lower Bound on Training-Based Channel Estimation Error for Frequency-Selective Block-Fading Rayleigh MIMO Channels," *IEEE Trans. Signal Processing*, vol. 52, pp. 3265-3277 (2004).
Yang et al., "Optimal Training for MIMO Fading Channels With Time-and-Frequency-Selectivity," *Proc. ICASSP '04 Conf.*, Montreal, Canada.
Golay, "Complementary Series," *IEEE Trans. Inform. Theory*, vol. 7, pp. 82-87 (1961).
Niu et al., "A Novel Matched Filter for Primary Synchronization Channel in W-CDMA," *Proc. IEEE Technol. Conf.*, Birmingham, AL.
Spasojevic et al., "Complimentary Sequences for ISI Channel Estimation," *IEEE Trans. Inform. Theory*, vol. 47, pp. 1145-1152 (2001).
Xu et al., "Channel Estimation Using Complimentary Sequence Pairs for UWB/OFDM Systems," *Electron Lett.*, vol. 40, pp. 1196-1197 (2004).
Wang et al., "Indoor MIMO Channels: A Parametric Correlation Model and Experimental Results," *In Proc. Sarnoff'04 Conf.*, Princeton, N.J.
Tseng et al., "Complimentary Sets of Sequences," *IEEE Trans. Inform. Theory*, vol. 18, pp. 644-652 (1972).
Popovic, "Efficient Golay Correlator," *Electron. Lett.*, vol. 35, pp. 1427-1428 (1999).

(Continued)

*Primary Examiner* — John Pezzlo
(74) *Attorney, Agent, or Firm* — Connolly Bove Lodge & Hutz LLP

(57) ABSTRACT

Embodiments of methods, devices and/or systems for estimating channel state information are described.

39 Claims, 6 Drawing Sheets

OTHER PUBLICATIONS

Bomer et al., "Periodic Complementary Binary Sequences," *IEEE Trans. Inform. Theory*, vol. 36, pp. 1487-1494 (1990).
Budisin, "Efficient Pulse Compressor for Golay Complementary Sequences," *Electron. Lett.*, vol. 27, pp. 219-220 (1991).
Taki et al., "Even-Shift Orthogonal Sequences," *IEEE Trans. Inform. Theory*, vol. 15, pp. 295-300 (1969).
International Preliminary Report on Patentability issued in related International Application No. PCT/IB2007/050189 on Sep. 4, 2008.
Foschini et al., "On Limits of Wireless Communications in a Fading Environment," Wireless Personal Commun., vol. 6, pp. 311-335 (1998).
Alamouti, "A Simple Transmit Diversity Technique for Wireless Communications," IEEE J. Select. Areas Commun., vol. 16, pp. 1451-1458 (1998).
Hassibi et al., "How Much Training is Needed in Multiple-Antenna Wireless Links?" IEEE Trans. Inform. Theory, vol. 49, pp. 951-963 (2003).
Simeone, "Lower Bound on Training-Based Channel Estimation Error for Frequency-Selective Block-Fading Rayleigh MIMO Channels," IEEE Trans. Signal Processing, vol. 52, pp. 3265-3277 (2004).
Yang et al., "Optimal Training for MIMO Fading Channels with Time-and-Frequency-Selectivity," Proc. ICASSP'04 Conf., Montreal, Canada (2004).
Golay, "Complementary Series," IEEE Trans. Inform. Theory, vol. 7, pp. 82-87 (1961).
Niu et al., "A Novel Matched Filter for Primary Synchronization Channel in W-CDMA," Proc. IEEE Technol. Conf., Birmingham, AL (2002).
Spasojevic et al., "Complimentary Sequences for ISI Channel Estimation," IEEE Trans. Inform. Theory, vol. 47, pp. 1145-1152 (2001).
Xu et al., "Channel Estimation Using Complimentary Sequency Pairs for UWGB/OFDM Systems," Electron Lett., vol. 40, pp. 1196-1197 (2004).
Wang et al., "Indoor MIMO Channels: A Parametric Correlation Model and Experimental Reults," In Proc. Sarnoff'04 Conf., Princeton, NJ (2004).
Tseng et al., "Complimentary Sets of Sequences," IEEE Trans. Inform. Theory, vol. 18, pp. 644-652 (1972).
Popovi, "Efficient Golay Correlator," Electron. Lett., vol. 35, pp. 1427-1428 (1999).
Bomer et al., "Periodic Complementary Binary Sequences," IEEE Trans. Inform. Theory, vol. 36, pp. 1487-1494 (1990).
Budisin, "Efficient Pulse Compressor for Golay Complementary Sequences," Electron. Lett., vol. 27, pp. 219-220 (1991).
Taki et al.,"Even-Shift Orthogonal Sequences," IEEE Trans. Inform. Theory, vol. 15, pp. 295-300, 1969—Refer to IDS Nov. 2, 2006.

\* cited by examiner

| Tx$_1$ | $CP_{a_1} = [a_{1(N-L)},...,a_{1(N-1)}]$ | $a_1 = [a_{10}, a_{11},...,a_{1(N-1)}]$ | $CP_{b_1} = [b_{1(N-L)},...,b_{1(N-1)}]$ | $b_1 = [b_{10}, b_{11},...,b_{1(N-1)}]$ |
| Tx$_2$ | $CP_{a_2} = [a_{2(N-L)},...,a_{2(N-1)}]$ | $a_2 = [a_{20}, a_{21},...,a_{2(N-1)}]$ | $CP_{b_2} = [b_{2(N-L)},...,b_{2(N-1)}]$ | $b_2 = [b_{20}, b_{21},...,b_{2(N-1)}]$ |
| ⋮ | ⋯ | ⋯ | ⋯ | ⋯ |
| Tx$_{N_T}$ | $CP_{a_{N_T}} = [a_{N_T(N-L)},...,a_{N_T(N-1)}]$ | $a_{N_T} = [a_{N_T0}, a_{N_T1},...,a_{N_T(N-1)}]$ | $CP_{b_{N_T}} = [b_{N_T(N-L)},...,b_{N_T(N-1)}]$ | $b_{N_T} = [b_{N_T0}, b_{N_T1},...,b_{N_T(N-1)}]$ |

*Fig. 1A*

SYSTEM AND/OR METHOD FOR CHANNEL ESTIMATION IN COMMUNICATION SYSTEMS

RELATED APPLICATION

The current patent application claims priority to U.S. Provisional Patent Application No. 60/645,526, filed on Jan. 20, 2005, titled "MIMO Channel Estimation Using Complimentary Sets of Sequences in Multiuser Environments", assigned to the assignee of the presently claimed subject matter.

FIELD

This disclosure is related to communications.

BACKGROUND

It may be desirable in communication systems to have the capability of performing channel estimation, such as in a MIMO communication system.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

FIGS. 1a and 1b are frame structures of training blocks for a MIMO system in accordance with an embodiment.

DETAILED DESCRIPTION

Figure 1B:
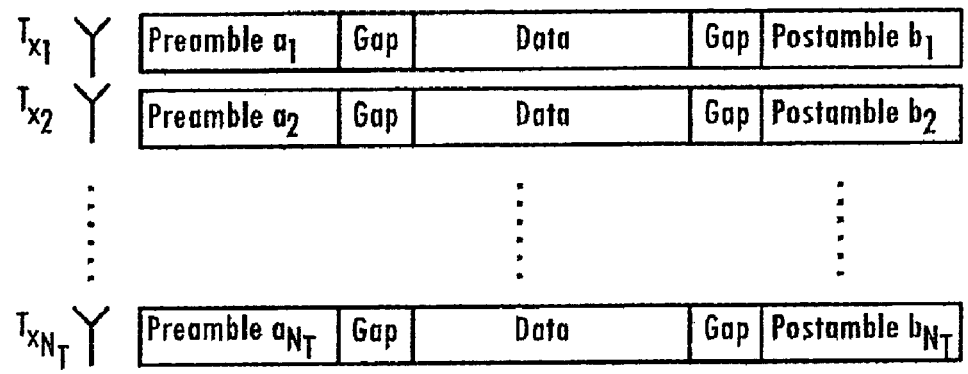

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the communications and/or data processing arts to convey the substance of their work to others skilled in the art. An algorithm is, generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

Unless specifically stated otherwise, as apparent from the following discussion, it is appreciated that throughout this specification discussions utilizing terms such as "calculating," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

The following discussion details several possible embodiments, although these are merely examples and are not intended to limit the scope of claimed subject matter. As another example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. Embodiments may be employed in a variety of possible communications devices, including, for example, cell phones, personal digital assistants, laptop computers, media players and the like. Of course, claimed subject matter is not limited to just these examples.

The utilization of antenna arrays in a wireless communication system may result in the presence of spatial diversity in the system. For example, a Multiple Input, Multiple Output (MIMO) system may employ a plurality of antenna arrays as transmitters and/or receivers. The spatial diversity may provide an increase in achievable capacity of the system and/or reliability of the system. In wireless communication systems utilizing antenna arrays, channel state information (CSI) may be desirable. However, CSI may not be available, and may, therefore, be estimated for one or more channels of the system. Typical system models of MIMO systems may rely on the assumption of known or a predetermined CSI. See, for example, G. J. Foschini and M. J. Gans, "On Limits of Wireless Communications in a Fading Environment," *Wireless Personal Commun.*, vol. 6, pp. 311-335, 1998 (hereinafter referred to as reference [1]), or S. M. Alamouti, "A simple transmit diversity technique for wireless communications," *IEEE J. Select. Areas Commun.*, vol. 16, pp. 1451-1458, 1998 (hereinafter referred to as reference [2]). However, in real-world applications, it may be desirable to estimate CSI by use of one or more estimation schemes.

At least two general types of estimation schemes may provide CSI estimation functionality. Blind estimation may comprise channel estimation that may be performed based on the structure of the received signal, for example. Blind estimation may be complex, and may impact the performance of a wireless communication system, for example. Training-based estimation may comprise providing one or more training signals, such as during a training period of a system. Training signals may be provided from one or more transmitters to one or more receivers of a wireless communications system. The training signals may be known by the receiver, and may be embedded in a signal, such as embedded in a frame, for example. Training-based estimation may reduce complexity and/or increase performance of a wireless communication system, for example. Some guidelines for designing training signals may be utilized when designing a training-based estimation scheme. See, for example, B. Hassibi and B. M. Hochwald, "How much training is needed in multiple-antenna wireless links?" *IEEE Trans. Inform.* Theory, vol. 49, pp. 951-963, 2003, (hereinafter referred to as reference [3]) or O. Simeone and U. Spagnolini, "Lower-bound on training-based channel estimation error for frequency-selective block-fading Rayleigh MIMO channels," *IEEE Trans. Signal Processing*, vol. 52, pp. 3265-3277, 2004 (hereinafter referred to as reference [4]). Additionally, designing training signals for a training-based channel estimation scheme may involve considerations such as Peak-to-Average-Power-Ratio (PAPR) of the communications system. See, for example, L. Yang, X. Ma, and G. B. Giannakis, "Optimal training for MIMO fading channels with time- and frequency-selectivity," in *Proc. ICASSP'04 Conf.*, Montreal, Canada (hereinafter referred to as reference [5]).

Without loss of generality, training signals may be provided to a receiver, and may include training blocks, and the blocks may comprise sets of sequences. However, it is worthwhile to note that the claimed subject matter is not limited in this respect. FIG. 1a may illustrate training blocks in the form of frames for a plurality of transmit antennae $T_{x_{NT}}$. As illustrated in FIG. 1a, the training blocks may comprise binary training blocks, or, in other words, may comprise a two sided structure, such as a frame, having a preamble and a postamble, and may include one or more gaps. Although not illustrated, training blocks may comprise more than two sided training blocks, and may, for example, include one or more midambles in at least one embodiment. Additionally, illustrated in FIG. 1b is a frame structure of a training block that may be implemented in a MIMO system, such as a MIMO-ISI system, for example. The sequences illustrated in FIG. 1b may comprise cyclic prefixed (CP) orthogonal complementary sets of sequences having at least preamble a and postamble b, for example.

Design of training signals for training-based channel estimation may utilize design models such as a Hadamard matrix and/or Golay complementary sequences. See, for example, M. J. E. Golay, "Complementary series," *IEEE Trans. Inform. Theory*, vol. 7, pp. 82-87, 1961 (hereinafter referred to as reference [6]) and K. Niu, S.-Q. Wang, et al., "A novel matched filter for primary synchronization channel in W-CDMA," in Proc. IEEE Vehic. Technol. Conf., Birmingham, Ala. (hereinafter referred to as reference [7]). However, the claimed subject matter is not limited with respect to these referenced design models, for example. Additionally, complementary sequence pair-based channel estimation for Single-input, Single-Output (SISO) systems may comprise one potential approach for designing training sequences for training-based channel estimation. See, for example, P. Spasojevic and C. N. Georghiades, "Complimentary sequences for ISI channel estimation," *IEEE Trans. Inform. Theory*, vol 47, pp. 1145-1152, 2001 (hereinafter referred to as reference [8]) and B. Xu and G. Bi, "Channel estimation using complimentary sequence pairs for UWB/OFDM systems," Electron. Lett., vol. 40, pp. 1196-1197, 2004 (hereinafter referred to as reference [9]). However, again, the claimed subject matter is not limited to just these referenced design models.

It may be desirable to consider the Cramer-Rao Lower Bound (CRLB) and/or a merit factor, such as the merit factor as defined in reference [8] when designing training signals for training-based channel estimation. Additionally, implementation of a training scheme for frequency estimation may utilize circular convolution and/or Fast-Fourier Transformation (FFT), although the claimed subject matter is not limited with respect to the particular manner of implementing schemes described herein, and it will be understood that numerous other computational approaches and/or techniques may be employed in embodiments of the claimed subject matter.

In one embodiment of the claimed subject matter, a scheme for channel estimation may be applied to a MIMO communications system having Inter-Symbol Interference (ISI). However, the claimed subject matter is not so limited. For example, at least a portion of the schemes described herein may be implemented in MIMO communications systems with frequency selective channels, frequency selective fading channels and/or other types and/or categories of channels not described in detail. As alluded to previously, a training-based estimation scheme may reduce estimation error, and/or may reduce the complexity of other estimation schemes such as blind estimation. Such an approach may be utilized, for example, in multi-user systems and other systems that may employ MIMO channels, such as MIMO-Ultra Wide Band (UWB), MIMO-Orthogonal Frequency Division Multiplexing (OFDM) compliant systems, and/or other systems that may utilize MIMO now existing or developed in the future.

Consider a MIMO frequency selective channel of a MIMO communication system. In this embodiment, the channel may have block fading. In other words, CSI may be invariant within one block of the MIMO channel, but may vary block by block. For example, an indoor MIMO system may include these properties, due at least in part to mobility characteristics of the indoor MIMO system. See, for example, S. Wang et al., "Indoor MIMO channels: A parametric correlation model and experimental results," in *Proc. Samoff'04 Conf.*, Princeton, N.J. (hereinafter referred to as reference [10]. In this embodiment, let $H=[H_0, H_1, \ldots H_l]$ comprise the discrete-time channel impulse response (CIR) of the MIMO frequency selective channel, wherein $H_l$, $0 \leq l \leq L$ is the $l^{th}$ tap of the MIMO CIR and may be given by the following matrix:

$$H_l = \begin{bmatrix} h_{1,1}(l) & \cdots & h_{1,N_T}(l) \\ \vdots & \ddots & \vdots \\ h_{N_R,1}(l) & \cdots & h_{N_R,N_T}(l) \end{bmatrix}, 0 \leq l \leq L, \quad (1)$$

wherein $h_{n_r,n_t}(l)$, $1 \leq n_r \leq N_R$, $1 \leq n_t \leq N_T$, $0 \leq l \leq L$ is the $l^{th}$ tap of the CIR between the $n^{th}_r$ receive antenna and the $n^{th}_t$ transmit antenna of the MIMO communication system. In this embodiment, an assumption that one or more subchannels of the system have unit power may be made, or, shown as an equation:

$$\sum_{l=0}^{L} E|h_{n_r,n_t}(l)|^2 = 1, 1 \leq n_r \leq N_R, 1 \leq n_t \leq N_T \quad (2)$$

wherein $E(\cdot)$ may comprise an expectation operator.

A received signal corresponding training block may additionally be rewritten as:

$$Y = \sqrt{\frac{SNR}{N_T}} HX + E \quad (3)$$

Wherein X may be given by the following matrix:

$$X = \begin{bmatrix} x(0) & x(1) & \cdots & x(N-1) & 0 & \cdots & 0 \\ 0 & \ddots & \ddots & \ddots & \ddots & \ddots & 0 \\ \vdots & \ddots & \ddots & \ddots & \ddots & \ddots & \vdots \\ 0 & \cdots & 0 & x(0) & x(1) & \cdots & x(N-1) \end{bmatrix} \quad (4)$$

Wherein $x(n)=[x_1(n), x_2(n), \ldots, x_{N_T}(n)]^T$, $0 \leq n \leq N-1$, and wherein:

$Y=[y(0),y(1),\ldots,y(N+L-1)]$ $y(n)=[y_1(n),y_2(n),\ldots,y_{N_R}(n)]^T, 0 \leq n \leq N+L-1$ $E=[e(0),e(1),\ldots,e(N+L-1)]$ $e(n)=[e_1(n),e_2(n),\ldots,e_{N_R}(n)]^T, 0 \leq n \leq N+L-1.$ (5)

In this embodiment, $x_{N_T}$ may comprise the training signal provided by the $n^{th}_t$ transmit antenna. The training signal may comprise a plurality of training blocks, which may be complementary, for example. The training signal may be provided at a time n, $y_{N_r}(n)$ may comprise the signal received by the $n^{th}_r$ receive antenna at a time n. $e_N^r(n)$ may comprise an additive noise component in $y_N^r(n)$, and SNR comprises the signal to noise ratio.

Alternatively, X may be given by the following matrix:

$$X = \begin{bmatrix} x(0) & x(1) & \cdots & x(N-1) \\ x(N-1) & x(0) & \cdots & x(N-2) \\ \vdots & \vdots & \ddots & \vdots \\ x(N-L) & x(N-L+1) & \cdots & x(N-L-1) \end{bmatrix} \quad (6)$$

wherein $x(n)=[x_1(n), x_2(n), \ldots, x_{N_T}(n)]^T$, $0 \leq n \leq N-1$, and wherein:

$Y=[y(0),y(1),\ldots,y(N-1)]$ $y(n)=[y_1(n),y_2(n),\ldots,y_{N_R}(n)]^T, 0 \leq n \leq N-1$ $E=[e(0),e(1),\ldots,e(N-1)]$ $e(n)=[e_1(n),e_2(n),\ldots,e_{N_R}(n)]^T, 0 \leq n \leq N-1.$ (7)

Additionally, a forward-shift permutation matrix $\pi$ of order N may be shown as:

$$\Pi = \begin{bmatrix} 0 & 1 & 0 & \cdots & 0 \\ 0 & 0 & 1 & \cdots & 0 \\ \vdots & \vdots & \vdots & \ddots & \vdots \\ 0 & 0 & 0 & \cdots & 1 \\ 1 & 0 & 0 & \cdots & 0 \end{bmatrix} \quad (8)$$

wherein $x=[x_1^T, x_2^T, \ldots, x_{N_T}^T]^T$, $x_i=[x_i(0, x_i(1), \ldots, x_i(N-1)]$, $1 \leq i \leq N_T$, and matrix (8) may be rewritten as:

$$X=[x^T(x\pi)^T(x\pi^2)^T \ldots (x\pi^L)^T]^T. \quad (9)$$

Design of training sequences for training-based channel estimation schemes may comprise designing sets of sequences having particular characteristics. For example, sets of sequences may comprise complimentary sets of sequences, uncorrelated periodic complementary sets of sequences and/or orthogonal periodic complimentary sets of sequences, as just a few examples. However, it is worthwhile to note that these sets of sequences are listed as examples, and the claimed subject matter is not limited in this respect. However, in one embodiment, complimentary sets of sequences may be designed and/or constructed according to design, definition and/or construction criteria.

For example, consider the following criteria for defining a complimentary set of sequences:

Let $x_i=[x_{i0}, x_{i1}, \ldots, x_{i(N-1)}]$ comprise a sequence of 1's and −1's, and let $$r_{x_i x_i}(k) = \sum_{l=0}^{N-1-k} x_{il} x_{i(l+k)}$$

comprise the aperiodic autocorrelation of the sequence $x_i$. A set of sequences ($x_i$, $0 \leq i \leq p-1$) comprise complimentary sequences if $$\sum_{i=0}^{p-1} r_{x_i x_i}(k) = 0, k \neq 0.$$

in one embodiment, sequences having equal length N may be considered, wherein $$\sum_{i=0}^{p-1} r_{x_i x_i}(0) = pN.$$

More discussion may be found regarding complimentary sets of sequences, for example, in the following: C. C. Tseng and C. L. Liu, "Complimentary sets of sequences," *IEEE Trans. Inform. Theory*, vol. 18, pp. 644-652, 1972, (hereinafter referred to as reference [11]).

In one embodiment, a Golay complimentary sequence pair having length $N=2^n$, $n \geq 1$ can be constructed with the following recursive approach:

$$x_{Oi}^{(n)} = x_{Oi}^{(n-1)} + x_{1(i-2^{n-1})}^{(n-1)} \qquad (10)$$

$$x_{1i}^{(n)} = x_{Oi}^{(n-1)} - x_{1(i-2^{n-1})}^{(n-1)}$$

wherein $x_{oi}^{(0)} = x_{1i}^{(0)} = \delta_i$, wherein $\delta_0 = 1$, $\delta_1 = 0$, $i \neq 0$. This may provide a complimentary set of sequences $x_0$ and $x_1$ having length N.

In another embodiment, periodic complimentary sets of sequences may be designed and/or constructed according to design and/or construction criteria. The periodic complementary sequences may be orthogonal and/or uncorrelated periodic sequences, in one or more embodiments. For example, consider the following criteria for defining a complimentary set of sequences:

Let $x_i = [x_{i0}, x_{i1}, \ldots, x_{i(N-1)}]$ comprise a sequence of 1's and −1's, and let $$\psi_{x_i x_i}(k) = \sum_{l=0}^{N-1} x_{il} x_{i(l+k)}, \, l+k(\text{mod} N), \, 0 \leq k \leq N-1$$

may comprise the periodic autocorrelation of the sequence $x_i$. A set of sequences $(x_i, 0 \leq i \leq p-1)$ is periodic complimentary if $$\sum_{i=0}^{p-1} \psi_{x_i x_i}(k) = 0, \, k \neq 0.$$

in one embodiment, sequences having period N may be considered, wherein $$\sum_{i=0}^{p-1} \psi_{x_i x_i}(0) = pN.$$

Again, more discussion may be found regarding complimentary sets of sequences, for example, in the following: C. C. Tseng and C. L. Liu, "Complimentary sets of sequences," *IEEE Trans. Inform. Theory*, vol. 18, pp. 644-652, 1972, (hereinafter referred to as reference [11]).

However, if another set of sequences $(y_i, 0 \leq i \leq p-1)$ is periodic complimentary and $$\sum_{i=0}^{p-1} \psi_{x_i y_i}(k) = 0, \, 0 \leq k \leq N-1,$$

wherein $$\psi_{x_i y_i}(k) = \sum_{l=0}^{N-1} x_{il} y_{i(l+k)}^*, \, l+k(\text{mod} N), \, 0 \leq k \leq N-1$$

then $(y_i, 0 \leq i \leq p-1)$ may correspond with $(x_i, 0 \leq i \leq p-1)$.

Additionally, a collection of periodic complimentary sets of sequences $(a_i, 0 \leq i \leq p-1), (b_i, 0 \leq i \leq p-1), \ldots, (z_i, 0 \leq i \leq p-1)$ are mutually uncorrelated if every two periodic complimentary sets of sequences in the collection correspond with respect to one another. Discussion of corresponding sets of sequences may be further described in reference [11], for example.

In another embodiment, a Golay complimentary sequence pair having length $N=2^n$, $n \geq 1$ can be constructed with the following:

$$x_{0,i}^{(k)} = x_{0,i}^{(k-1)} + w_k x_{1,(i-2^{n-k})}^{(k-1)} \qquad (11)$$

$$x_{1,i}^{(k)} = x_{0,i}^{(k-1)} - w_k x_{1,(i-2^{n-k})}^{(k-1)}$$

wherein $x_{0,1}^{(0)} = x_{1,i}^{(0)} = \delta_i$, $\delta_0 = 1$, $\delta_i = 0$, $i \neq 0$. In this embodiment, $W_k$ comprises a complex number with unit amplitude. After n interactions, a pair of complementary sequences $x_0$ and $x_1$ may be produced having length N. Additionally, $\tilde{x}_0$ and $x_1$ are complementary. Additionally, this leads to a general conclusion that if (a, b) are a complementary set, then $(\tilde{b}, -\tilde{a})$ is a corresponding set, which may also be referred to as a mate. As one example, based on one or more of equation (10) or (11), if N=16, $x_0=[+++-++-+++---+-]$, $x_1=[+++-++-+---+++-+]$, $y_0=[+-+++---+-++-+++]$ and $y_1=[+-+++----+--+---]$ may comprise two complementary sets of sequences, for example.

In at least one embodiment, the maximum number of complimentary sets of sequences may not be defined. However, for a binary case there are two uncorrelated sets if each set has only two sequences, which may limit applications in MIMO systems. However, this issue may be addressed by taking one or more of the following approaches in the binary case:
1) Assign the sequences to pairs of transmit antennae having different phases.
2) expand the number of sequences in each complementary set. (See reference [11], for example).
3) Construct more sequences having a zero correlation window (ZCW) based on the complementary sets.
However, it is worthwhile to note that these are just example approaches, and the claimed subject matter is not so limited.

Design of training sequences for training-based channel estimation schemes may incorporate design criteria. For example, maximum likelihood estimation (MLE), least-square estimation (LSE) and/or linear minimum mean-square error (LMMSE) may be utilized as design criteria. For example, equation (3) may be redrafted as:

$$y = \sqrt{\frac{SNR}{N_T}} (X^T \otimes I_{N_R}) h + e \qquad (12)$$

wherein $\otimes$ comprises the Kronecker product, y=vec(Y), h=vec(H), e=vec(E), wherein vec(•) stacks all of the columns of its arguments in one column vector. In this embodiment, e may comprise a complex AWGN vector having unit variance on each component. In this embodiment, MLE of h may be reduced to the LSE of H. This may be given by:

$$\hat{H}_{ML} = \sqrt{\frac{N_T}{SNR}} Y X^H (XX^H)^{-1} \quad (13)$$

Additionally, the covariance of matrix and the MSE of $\hat{h}$ are $$\frac{N_T}{SNR}((X*X^T)^{-1} \otimes I_{N_R}) \text{ and } \frac{N_R N_T}{SNR} tr((X*X^T)^{-1}) \quad (15)$$

respectively. In one embodiment, the MSE of $\hat{h}$ may be minimized if the training sequences satisfy the condition of $XX^H \propto I$. If this condition is satisfied, in this embodiment, the MLE of h may have a variance that achieves a reduced Cramer-Rao lower bound (CRLB). For example, a reduced CRLB may be achieved by constructing two binary training blocks that satisfy $$X_{pre}X_{pre}^H + X_{post}X_{post}^H \propto I. \quad (14)$$

Additionally, the LMMSE of H may be given by:

$$\hat{H}_{LMMSE} = \sqrt{\frac{N_T}{SNR}} Y X^H \left( XX^H + \frac{N_T}{SNR} I \right)^{-1} \quad (15)$$

The covariance matrix and the MSE of $\hat{h}_{ML}$ may comprise $$\frac{N_T}{SNR}((X*X^T)^{-1} \otimes I_{N_R}) \text{ and } \frac{N_R N_T}{SNR} tr((X*X^T)^{-1}),$$

respectively. Minimizing the MSE of $\hat{h}_{ML}$ may involve satisfying the condition $XX^H \propto I$. If this condition is satisfied, the training sequence of one or more antennae of a MIMO system may be substantially orthogonal, for example.

A channel estimation algorithm may be designed based at least in part on one or more of the above-described criteria. In this embodiment, assume $(\tilde{x}_0, x_1)$ and $(\tilde{x}_1, -x_0)$ are mutually orthogonal, and assume $N_T=2$. Additionally, in this embodiment, $\tilde{x}_0$ and $\tilde{x}_1$ comprise the preamble of transmit antennae $T_{x_1}$ and $T_{x_2}$, respectively. Additionally, $x_1$ and $-x_0$ comprise the postamble of transmit antennae $T_{x_1}$ and $T_{x_2}$, respectively. In this embodiment:

$$[Y_{pre}, Y_{post}] = \sqrt{\frac{SNR}{N_T}} H[X_{pre}, X_{post}] + [E_{pre}, E_{post}], \quad (16)$$

so the LSE of H, $$\hat{H} = \sqrt{\frac{N_T}{SNR}}(Y_{pre}X_{pre}^H + Y_{post}X_{post}^H)(X_{pre}X_{pre}^H + X_{post}X_{post}^H)^{-1}$$

which, based on the preamble and postamble assignments, can be redrafted as:

$$\hat{H} = \frac{\sqrt{N_T}}{2N\sqrt{SNR}}(Y_{pre}X_{pre}^H + Y_{post}X_{post}^H) \quad (17)$$

in an alternative embodiment, assume $(\tilde{x}_0, x_1), (\tilde{x}_1, -x_0)$ are mutually uncorrelated. Additionally, assume $N_T$ is even. The following assignments may be made for transmit antennae $T_x$ for complementary sets of sequences (a, b):

| $T_x$ | a | b | (18) |
|---|---|---|---|
| 1 | $\tilde{x}_0$ | $x_1$ | |
| 2 | $\tilde{x}_1$ | $-x_0$ | |
| 3 | $\tilde{x}_0\prod^{-(L+1)}$ | $x_1\prod^{-(L+1)}$ | |
| 4 | $\tilde{x}_1\prod^{-(L+1)}$ | $-x_0\prod^{-(L+1)}$ | |
| ⋮ | ⋮ | ⋮ | |
| $N_T-1$ | $\tilde{x}_0\prod^{-(N_T-1)(L+1)}$ | $x_1\prod^{-(N_T-1)(L+1)}$ | |
| $N_T$ | $\tilde{x}_1\prod^{-(N_T-1)(L+1)}$ | $-x_0\prod^{-(N_T-1)(L+1)}$ | | wherein $x\pi^{-1}$ may shift the sequence x cyclically to the left by I elements. Alternatively, if $N_T$ is odd, the following assignments may be made:

| $T_x$ | a | b | (19) |
|---|---|---|---|
| 1 | $\tilde{x}_0$ | $x_1$ | |
| 2 | $\tilde{x}_1$ | $-x_0$ | |
| 3 | $\tilde{x}_0\prod^{-(L+1)}$ | $x_1\prod^{-(L+1)}$ | |
| 4 | $\tilde{x}_1\prod^{-(L+1)}$ | $-x_0\prod^{-(L+1)}$ | |
| ⋮ | ⋮ | ⋮ | |
| $N_T-2$ | $\tilde{x}_0\prod^{-(N_T-2)(L+1)}$ | $x_1\prod^{-(N_T-2)(L+1)}$ | |
| $N_T-1$ | $\tilde{x}_1\prod^{-(N_T-2)(L+1)}$ | $-x_0\prod^{-(N_T-2)(L+1)}$ | |
| $N_T$ | $\tilde{x}_0\prod^{-(N_T-1)(L+1)}$ | $x_1\prod^{-(N_T-1)(L+1)}$ | | and, additionally, the last antenna $N_T$ may be assigned another pair of complementary sequences, such as the following:

$$(a_{N_T}, b_{N_T}) = (x_1\pi - (N_T-1), -x_0\pi - (N_T-1)(L+1)) \quad (20)$$

Inter-path interference may be substantially reduced or avoided if the condition $$\left[\frac{N_T}{2}\right](L+1) \leq N$$

is satisfied, for example. Additionally, by showing:

$$[Y_A, Y_B] = \sqrt{\frac{SNR}{N_T}} H[X_A, X_B] + [E_A, E_B], \quad (21)$$

then the LSE of H may be shown:

$$\hat{H}_{ML} = \sqrt{\frac{N_T}{SNR}} \left( \sum_{i \in \{A,B\}} Y_i X_i^H \right) \left( \sum_{i \in \{A,B\}} X_i X_i^H \right)^{-1} \quad (22)$$

If the above assignments are utilized, it may be shown:

$$\hat{H}_{ML} = \frac{\sqrt{N_T}}{2N\sqrt{SNR}} \sum_{i \in \{A,B\}} Y_i X_i^H \quad (23)$$

Therefore, the LMMSE estimate of H may be shown:

$$\hat{H}_{LMMSE} = \frac{\sqrt{SNR N_T}}{2SNR N + N_T} \sum_{i \in \{A,B\}} Y_i X_i^H \quad (24)$$

$$= \frac{2SNR N}{2SNR N + N_T} \hat{H}_{ML}$$

An embodiment of a channel estimator may utilize a filter structure. For example, referring now to FIG. 2, there is illustrated a filter structure 102. The filter structure 102 may be mathematically modeled by taking the Z-transform of both sides of equation (10). This may result in the following:

$$X_0^{(n)}(z) = X_0^{(n-1)}(z) + X_1^{(n-1)}(z) z^{-2^{n-1}}$$

$$X_1^{(n)}(z) = X_0^{(n-1)}(z) - X_1^{(n-1)}(z) z^{-2^{n-1}} \quad (25)$$

wherein $X_0^{(0)}(z) = X_1^{(0)}(z) = 1$

Figure 2:
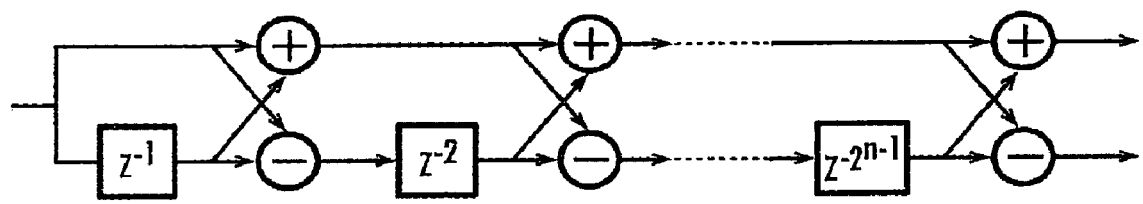
FIG. 2 is a schematic diagram illustrating an embodiment of a filter structure that may be employed in a communications system.

Alternatively, a filter structure as shown in FIG. 2 may be implemented on a plurality of antennae of a MIMO system. This may enable parallel processing, which may increase the speed of performing estimating functions, for example. In one embodiment, postamble processing may utilize a last in first out (LIFO) scheme on the received data to enable use of the same filter utilized for preamble processing. Additionally, an efficient Golay correlator (EGC) may be utilized. See, for example, B. M. Popovic, "Efficient Golay correlator," *Electron. Lett.*, vol. 35, pp. 1427-1428, 1999, (hereinafter reference [12]).

In one embodiment, a training sequence may be defined as A. A may comprise $Y_A X_A^H$, wherein $Y_A$ comprises a received signal and $X_A$ comprises a training block, such as one or more of the training blocks described previously. For example, in one embodiment, $X_A$ may comprise a circulant matrix. In this embodiment, $Y_A X_A^H$ may be implemented efficiently by FFT. For example, assume C is a circulant matrix. In this example, C may be diagonalized by a Fourier transform matrix $$F = (f_{i,j}) = \frac{1}{\sqrt{N}} (\omega^{(i-1)(j-1)}), \text{ with } \omega = \exp\left(-\frac{2\pi i}{N}\right),$$

which may be shown as
C=$F^H \Delta F$, wherein $$\Delta = \sqrt{N} \text{diag}(cF^H), C = \text{circ}(c) = (c_{j,k}) = (c_{(k-j) \mod n}), c = [c_0, c_1, \ldots, c_{n-1}] \quad (26)$$

Figure 3:
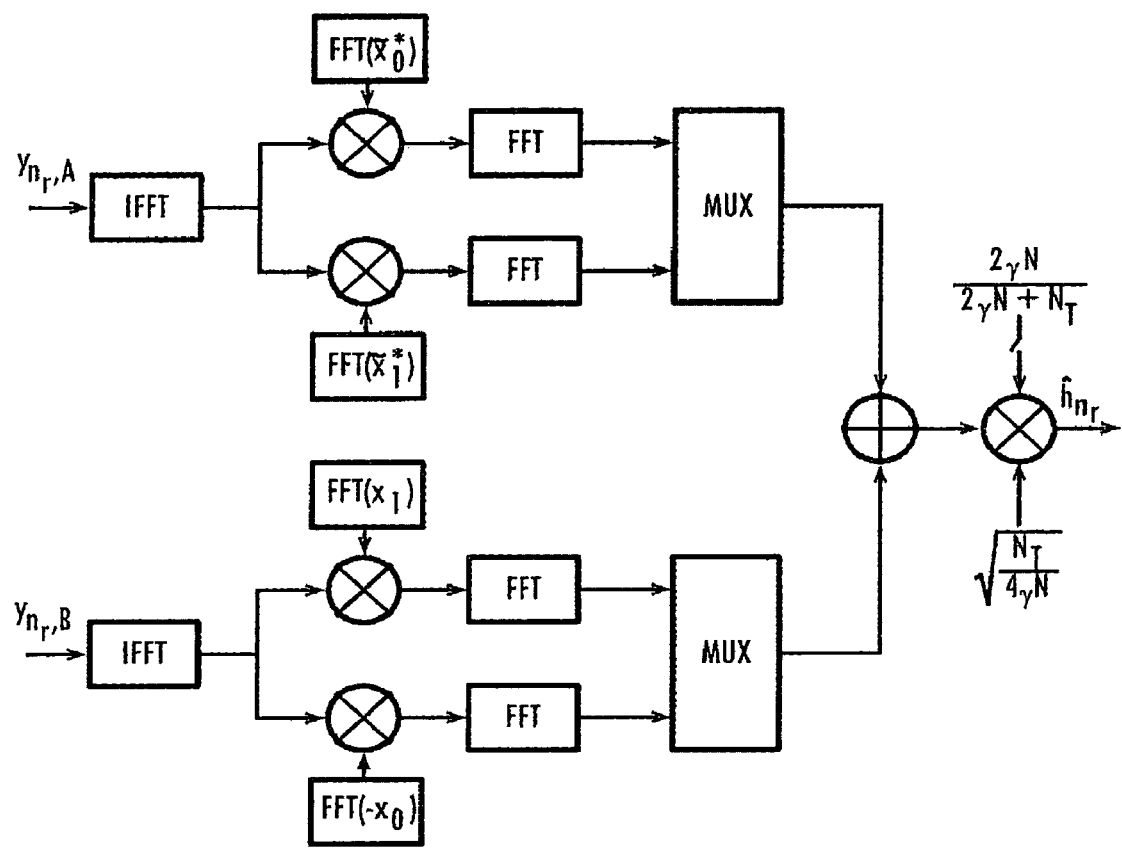
FIG. 3 is a schematic diagram illustrating an embodiment of channel estimator that may be employed in a communications system.

Implementation of training blocks in a MIMO system may be explained in more detail with reference to FIG. 3. Illustrated in FIG. 3 is a Fast Fourier implementation of a channel estimator in accordance with at least one embodiment. In this embodiment, the number of points in the FFT operation may be N, wherein N is the period of the sequences. The switch may be utilized to select the estimation method. For example, LM may be utilized when the switch is open, and LMMSE may be utilized when the switch is closed. Of course, the claimed subject matter is not limited in this respect.

In this embodiment, for the $n_r^{th}$ antenna of a MIMO system $y_{n_r,A} X_A^H$, may be determined by:

$$y_{n_r,A} X_{a1}^H = y_{n_r,A} (F^H \Delta_{\tilde{x}_0} F)^H \quad (27)$$

$$= [(y_{n_r,A} F^H) \Delta_{\tilde{x}_0}^H] F$$

$$= \sqrt{N} FFT(FFT(\tilde{x}_0^*) \circ IFFT(y_{n_r,A}))$$

wherein ○ comprises the Hadamard product and * means conjugate. The even columns may be determined by:

$$y_{n_r,A} X_{a2}^H = \sqrt{N} FFT(FFT(\tilde{x}_1^*) \circ IFFT(y_{n_r,A})) \quad (28)$$

The odd columns of $y_{n_r,B} X_B^H$ may be determined by:

$$y_{n_r,B} X_{b1}^H = \sqrt{N} FFT(FFT(x_1^*) \circ IFFT(y_{n_r,B})) \quad (29)$$

The even columns of $y_{n_r,} BX_B^H$ may be determined by:

$$y_{n_r,B} X_{b2}^H = \sqrt{N} FFT(FFT(x_0^*) \circ IFFT(y_{n_r,B})) \quad (30)$$

Figure 4:
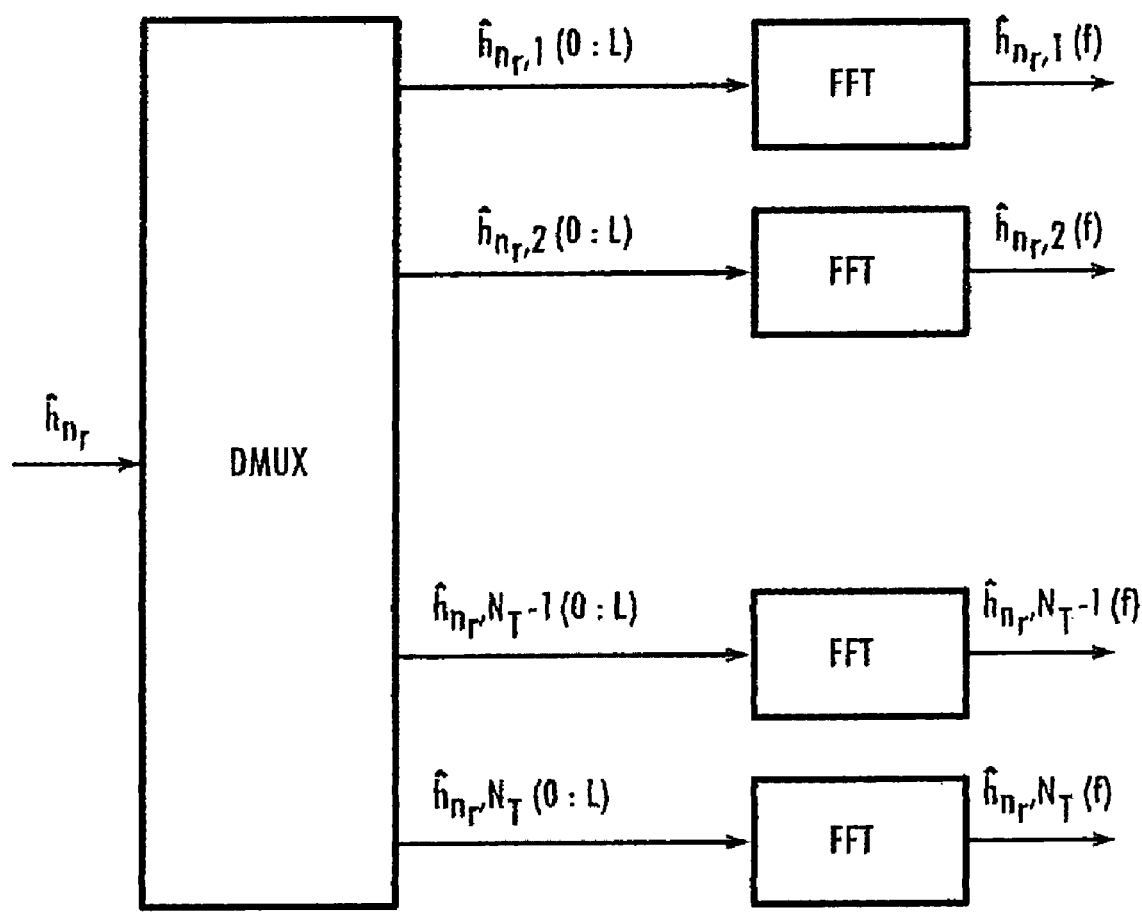
FIG. 4 is a schematic diagram illustrating an embodiment of a communications system for channel estimation.

In one embodiment, a channel estimation scheme may be employed in an Orthogonal frequency division multiplexing (OFDM) system, such as a MIMO-OFDM system. In this embodiment, channel estimation may be performed based at least in part on time-domain estimation and/or frequency-domain estimation. Implementation of a channel estimation scheme may be illustrated in FIG. 4. Illustrated in FIG. 4 is an implementation of a channel estimation scheme, wherein a frequency-domain channel impulse response may be derived from a FFT transform. Of course, the claimed subject matter is not limited in this respect.

In an embodiment wherein each set of complementary sequences includes p periodic complementary sequences, the received signal corresponding to the $i^{th}$ training block may be illustrated as:

$$Y_i = \sqrt{\frac{SNR}{N_T}} H X_i + E_i \quad (31)$$

wherein $E_i$ may comprise AWGN. Additionally, the MLE of the CIR of H may comprise:

$$\hat{H}_{ML} = \sqrt{\frac{N_T}{SNR}} \sum_{i=0}^{p-1} Y_i X_i^H \left( \sum_{i=0}^{p-1} X_i X_i^H \right)^{-1} \quad (32)$$

The LMMSE of the CIR H may comprise:

$$\hat{H}_{LMMSE} = \sqrt{\frac{N_T}{SNR}} \sum_{i=0}^{p-1} Y_i X_i^H \left( \sum_{i=0}^{p-1} X_i X_i^H + \frac{N_T}{SNR} I \right)^{-1} \quad (33)$$

If uncorrelated periodic complementary sets of sequences are utilized, Equation (32) may be simplified as:

$$\hat{H}_{ML} = \frac{\sqrt{N_T}}{pN\sqrt{SNR}} \sum_{i=0}^{p-1} Y_i X_i^H \quad (34)$$

and equation (33) may be simplified as:

$$\hat{H}_{LMMSE} = \frac{\sqrt{SNRN_T}}{pSNRN + N_T} \sum_{i=0}^{p-1} Y_i X_i^H \quad (35)$$

Figure 5:
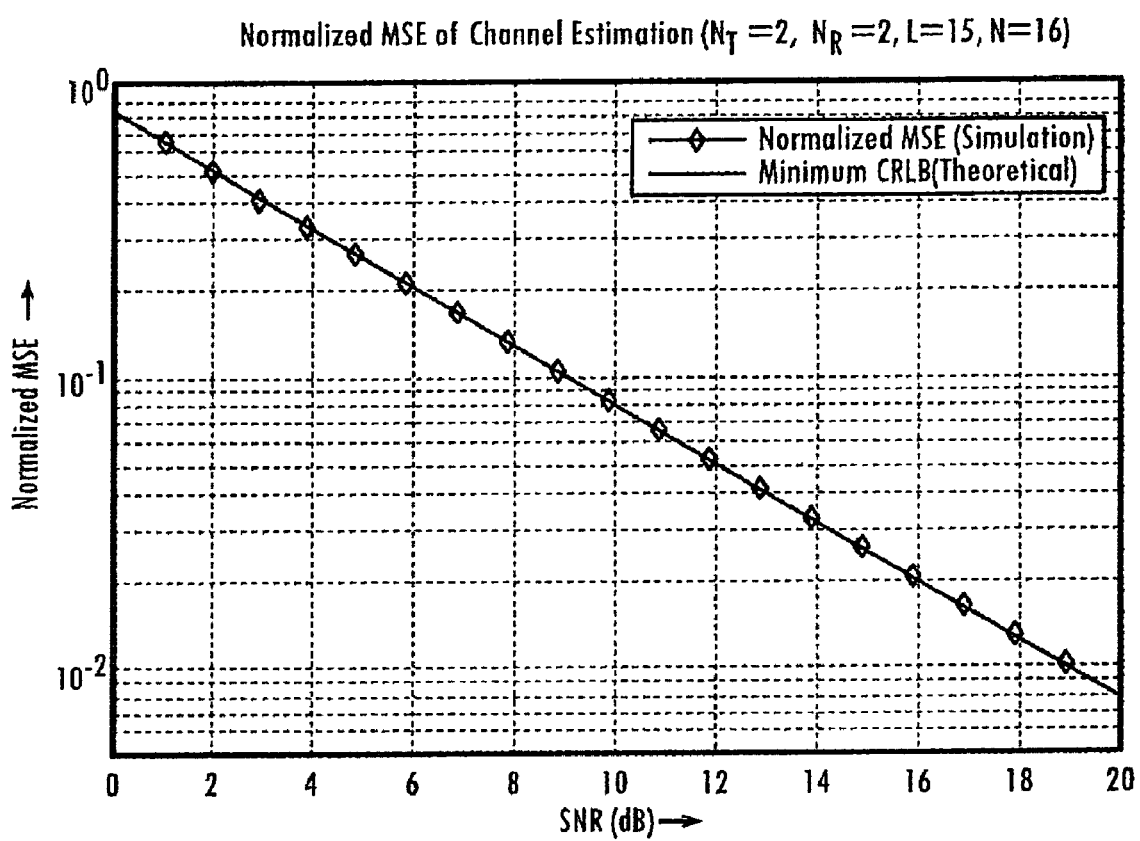
FIG. 5 is a plot illustrating simulated performance results of employing various embodiments of a method of channel estimation.
Figure 6:
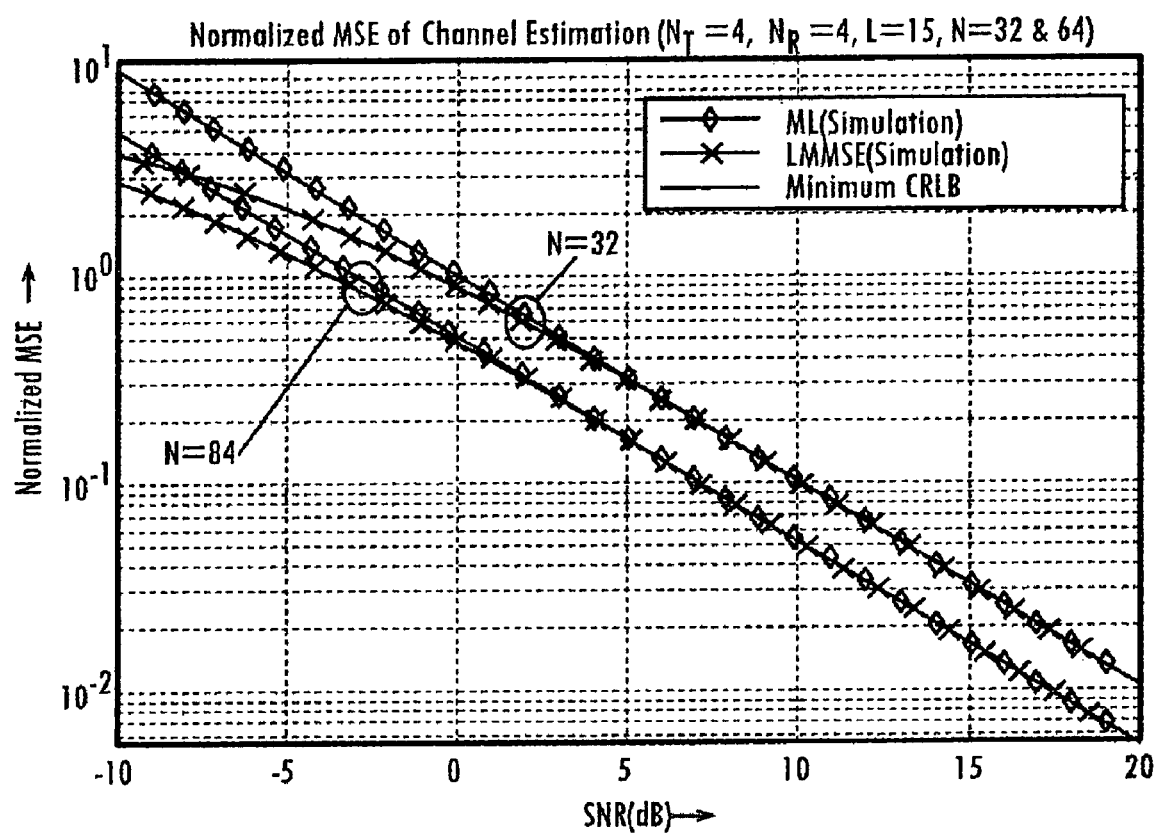
FIG. 6 is a plot illustrating simulated performance results of employing various embodiments of a method of channel estimation.

Illustrated in FIG. 5 and FIG. 6 are graphs illustrating the MSE of channel estimation of alternative schemes. FIG. 5 is a graph illustrating the MSE of a complementary set of sequences and/or an orthogonal periodic complementary set of sequences. In this graph, L=15, which means there are 16 taps in each subchannel, $N_T$=2, $N_R$=2 and N=16. The normalized theoretical minimum CRLB may be shown as $$\frac{N_R N_T^2(L+1)}{2NSNR\|H\|_F^2}$$

and simulated MSE of channel estimation $$\frac{\|\hat{H} - H\|_F^2}{\|H\|_F^2}$$

versus different SNR levels, wherein $\|\cdot\|_F$ may indicate the Frobenius norm. The graph of FIG. 3 illustrates that, in this example, the minimum CRLB may be achieved.

Referring now to FIG. 6, in this graph, L=15, $N_T$=4, $N_R$=4 and N=32. The normalized theoretical minimum CRLB may be shown as $$\frac{N_R N_T^2(L+1)}{2NSNRE\|H\|_F^2} = \frac{N_T(L+1)}{2\gamma N} \quad (36)$$

and the normalized MSE of MLE and LMMSE $$\frac{\overline{\|\hat{H} - H\|_F^2}}{\|H\|_F^2}$$

versus different SNR levels, wherein $\overline{(\cdot)}$ refers to the arithmetic average. The graph of FIG. 3 illustrates that, in this example, the minimum CRLB may be achieved.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of estimating channel state information in a receiver employing a multi-input, multi-output (MIMO) scheme, comprising:
   estimating channel state information for at least one channel of the receiver employing the MIMO scheme, based at least in part on a received training signal that comprises a complementary set of training sequences.

2. The method of claim 1, wherein the complementary set of training sequences comprises an orthogonal periodic complementary set of sequences.

3. The method of claim 1, wherein the complementary set of training sequences comprises an uncorrelated periodic complementary set of sequences.

4. The method of claim 1, wherein the training sequences are embodied in at least one frame of the training signal.

5. The method of claim 1, wherein said estimating employs one or more Fast Fourier Transform (FFT) operations.

6. The method of claim 1, wherein the training signal comprises one or more training blocks having at least a preamble and a postamble.

7. The method of claim 6, wherein the preamble and the postamble comprise respective complementary sequences.

8. The method of claim 1, wherein estimating channel state information comprises a technique selected from the group consisting of maximum-likelihood estimation (MLE), least-squares estimation (LSE), and minimum mean-square estimation (MMSE).

9. The method of claim 1, wherein estimating channel state information comprises filtering characterized by the following equations, in z-transform format:

$$X_0^{(n)}(z) = X_0^{(n-1)}(z) + X_1^{(n-1)}(z) z^{-2^{n-1}}$$

$$X_1^{(n)}(z) = X_0^{(n-1)}(z) - X_1^{(n-1)}(z) z^{-2^{n-1}},$$

wherein $X_0^{(0)}(z) = X_1^{(0)}(z) = 1$.

10. A system, comprising:
   a receiver employing a multi-input, multi-output (MIMO) scheme; and
   a transmitter to provide a training signal to the receiver, wherein at least a portion of the training signal comprises a complementary set of training sequences,
   wherein the receiver is adapted to estimate channel state information for at least one channel of the MIMO system, based at least in part on the provided training signal.

11. The system of claim 10, wherein the complementary set of training sequences comprises an orthogonal periodic complementary set of sequences.

12. The system of claim 10, wherein the complementary set of training sequences comprises an uncorrelated periodic complementary set of sequences.

13. The system of claim 10, wherein the receiver is adapted to employ one or more Fast Fourier Transform (FFT) operations.

14. The system of claim 10, wherein the training signal comprises one or more training blocks having at least a preamble and a postamble.

15. The system of claim 14, wherein the preamble and the postamble comprise respective complementary sequences.

16. The system of claim 10, wherein the receiver is substantially compliant with aspects of IEEE 802.11.

17. The system of claim 10, wherein the receiver is incorporated in at least one device selected from the group consisting of: a cell phone; a personal digital assistant; a laptop computer; a media player device.

18. An apparatus comprising:
   a receiver for a multi-input, multi-output (MIMO) communication system corresponding to at least two channels; and
   an estimator coupled to receive one or more outputs of the receiver to estimate channel state information for at least one of said channels based at least in part on a received training signal comprising a complementary set of sequences.

19. The apparatus of claim 18, wherein the training signal comprises one or more training blocks having at least a preamble and a postamble.

20. The apparatus of claim 19, wherein the preamble and the postamble comprise respective complementary sequences.

21. The apparatus of claim 18, wherein the receiver is substantially compliant with aspects of IEEE 802.11.

22. The apparatus of claim 18, wherein apparatus comprises at least one device selected from the group consisting of: a cell phone; a personal digital assistant; a laptop computer; a media player device.

23. The apparatus of claim 18, wherein the complementary set of training sequences comprises an orthogonal periodic complementary set of sequences.

24. The apparatus of claim 18, wherein the complementary set of training sequences comprises an uncorrelated periodic complementary set of sequences.

25. The apparatus of claim 18, wherein the estimator is selected from the group consisting of a maximum-likelihood estimator (MLE), a least-squares estimator (LSE), and a minimum mean-square estimator (MMSE).

26. The apparatus of claim 18, wherein the estimator includes a filter structure characterized by the following equations, in z-transform format:

$$X_0^{(n)}(z)=X_0^{(n-1)}(z)+X_1^{(n-1)}(z)z^{-2^{n-1}}$$

$$X_1^{(n)}(z)=X_0^{(n-1)}(z)-X_1^{(n-1)}(z)z^{-2^{n-1}},$$

wherein $X_0^{(0)}(z)=X_1^{(0)}(z)=1$.

27. The apparatus of claim 18, wherein the estimator comprises:
   at least one inverse fast Fourier transform (IFFT) block coupled to said receiver to receive a receiver output corresponding to a particular one of said channels;
   multipliers to multiply an output of the IFFT block by respective transformed versions of complementary sequences corresponding to the particular one of said channels;
   fast Fourier transform (FFT) blocks to transform the respective outputs of the multipliers; and
   a multiplexer (MUX) to multiplex the outputs of the FFT blocks.

28. The apparatus of claim 27, further comprising:
   an adder to add an output of the MUX to outputs of other MUXes corresponding to one or more other channels.

29. The apparatus of claim 18, wherein the estimator comprises a frequency-domain estimator.

30. The apparatus of claim 29, wherein the frequency-domain estimator comprises at least one FFT block.

31. A computer-readable medium containing instructions that, if executed by a computing device, cause the computing device to implement a method of estimating channel state information in a receiver employing a multi-input, multi-output (MIMO) scheme, the method comprising:
   estimating channel state information for at least one channel of the receiver employing the MIMO scheme, based at least in part on a received training signal that comprises a complementary set of training sequences.

32. The medium of claim 31, wherein the complementary set of training sequences comprises an orthogonal periodic complementary set of sequences.

33. The medium of claim 31, wherein the complementary set of training sequences comprises an uncorrelated periodic complementary set of sequences.

34. The medium of claim 31, wherein the training sequences are embodied in at least one frame of the training signal.

35. The medium of claim 31, wherein estimating channel state information employs one or more Fast Fourier Transform (FFT) operations.

36. The medium of claim 31, wherein the training signal comprises one or more training blocks having at least a preamble and a postamble.

37. The medium of claim 36, wherein the preamble and the postamble comprise respective complementary sequences.

38. The medium of claim 31, wherein estimating channel state information comprises a technique selected from the group consisting of maximum-likelihood estimation (MLE), least-squares estimation (LSE), and minimum mean-square estimation (MMSE).

39. The medium of claim 31, wherein estimating channel state information comprises filtering characterized by the following equations, in z-transform format:

$$X_0^{(n)}(z)=X_0^{(n-1)}(z)+X_1^{(n-1)}(z)z^{-2^{n-1}}$$

$$X_1^{(n)}(z)=X_0^{(n-1)}(z)-X_1^{(n-1)}(z)z^{-2^{n-1}},$$

wherein $X_0^{(0)}(z)=X_1^{(0)}(z)=1$.

* * * * *

UNITED STATES PATENT AND TRADEMARK OFFICE
CERTIFICATE OF CORRECTION

| | |
|---|---|
| PATENT NO. | : 7,929,563 B2 |
| APPLICATION NO. | : 11/336018 |
| DATED | : April 19, 2011 |
| INVENTOR(S) | : Wang et al. |

Page 1 of 1

It is certified that error appears in the above-identified patent and that said Letters Patent is hereby corrected as shown below:

Title page, item (56), under "Other Publications", in Column 2, Line 7, delete "et at," and insert -- et al., --.

Title page 2, item (56), under "Other Publications", in Column 2, Line 8, delete "Sequency" and insert -- Sequence --.

Title page 2, item (56), under "Other Publications", in Column 2, Line 12, delete "Reults," and insert -- Results, --.

Column 15, line 46, in Claim 27, delete "inverse fast Fourier transform" and insert -- Inverse Fast Fourier Transform --.

Column 16, line 1, in Claim 27, delete "fast Fourier transform" and insert -- Fast Fourier Transform --.

Signed and Sealed this
Ninth Day of August, 2011

David J. Kappos
*Director of the United States Patent and Trademark Office*